United States Patent [19]

Schmidt et al.

[11] Patent Number: 4,690,964

[45] Date of Patent: Sep. 1, 1987

[54] THERMOPLASTIC POLYURETHANE COMPOSITIONS HAVING IMPROVED FLAME RESISTANCE

[75] Inventors: Manfred Schmidt, Krefeld, Fed. Rep. of Germany; Robert P. Yeater, Moundsville, W. Va.

[73] Assignee: Mobay Corporation, Pittsburgh, Pa.

[21] Appl. No.: 461,063

[22] Filed: Jan. 26, 1983

[51] Int. Cl.$^4$ .................. C08K 5/53; C08F 283/00
[52] U.S. Cl. .................................. 524/125; 524/539; 525/438; 525/439; 525/440; 525/454; 525/460; 525/538
[58] Field of Search ............... 524/101, 109, 114, 125, 524/131, 132, 141, 125, 539; 525/438, 454, 460, 488, 538

[56] References Cited

U.S. PATENT DOCUMENTS

| | | | |
|---|---|---|---|
| 2,682,522 | 6/1964 | Coover, Jr. et al. | 528/167 |
| 4,145,333 | 3/1979 | Minagawa et al. | 524/125 |
| 4,331,614 | 5/1982 | Schmidt et al. | 528/167 |
| 4,333,869 | 6/1982 | Marciandi et al. | 524/101 |
| 4,350,799 | 9/1982 | Schmelzer et al. | 525/439 |
| 4,413,101 | 11/1983 | Schmidt et al. | 525/440 |

FOREIGN PATENT DOCUMENTS 2944093 5/1981 Fed. Rep. of Germany.

OTHER PUBLICATIONS

S. Patai, Chemistry of Cyanates and Thio Derivatives, vol. 2, pp. 743 (1977).
Saunders et al., Polyurethanes, Chemistry & Technology vol. 1, pp. 105 & 108 (1962).
Hach's Chemical Dictionary, 4th ed. p. 514.
The Condensed Chemical Dictionary 9th ed. p. 679.

*Primary Examiner*—John Kight
*Assistant Examiner*—Krieltion Morgan
*Attorney, Agent, or Firm*—Gene Harsh; Joseph C. Gil; Aron Preis

[57] ABSTRACT

The present invention is directed to a thermoplastic molding composition comprising thermoplastic polyurethane and an additive amount of an oligomeric polyalkylphosphonate, characterized by its improved flame resistance.

6 Claims, No Drawings

THERMOPLASTIC POLYURETHANE COMPOSITIONS HAVING IMPROVED FLAME RESISTANCE

FIELD OF THE INVENTION

The invention is related to a thermoplastic polyurethane composition and, more particularly, to a blend thereof comprising an oligomeric alkyl phosphonate.

BACKGROUND OF THE INVENTION

Because of their unique combination of mechanical properties, thermoplastic polyurethanes (hereinafter TPU) have been extensively used in a variety of molding applications. Articles molded therefrom have met the stringent engineering criteria governing applications in the automotive, electrical, mechanical equipment and footwear industries. However, the flammability rating of TPU (UL-94⅛", V-2) limits their utility in certain applications where a greater resistance to flame is required. Halogenated fire retardants, singly or in combination with antimony oxide have been reported to improve the flame retardance of these resins but are known to be unsuitable for some applications where the evolution of hydrogen halides attended upon combustion is a determining factor.

Thermoplastic polyphosphonates are characterized by their exceptionally high rating of flame resistance—see, for instance, German No. DOS 2,944,093. Due in part to their level of mechanical properties, however, thermoplastic polyphosphonates are beneficially used in a narrower field of application.

Polyblends of TPU and certain thermoplastic polyphosphonates purposed at combining their individually useful properties are the subject of Ser. No. 318,730 filed Nov. 6, 1981, now U.S. Pat. No. 4,413,101. It has been, however, the experience of those skilled in the art that certain thermoplastic polyphosphonates desirable as components in a blend with TPU are not compatible therewith and the resulting blends are inhomogeneous, poorly dispersed mixtures which are unsuited for molding applications.

BRIEF DESCRIPTION OF THE INVENTION

Thermoplastic molding compositions comprising thermoplastic polyurethane and an additive amount of certain oligomeric polyalkylphosphonates were prepared, indicating a surprising compatibility of the components. Compositions comprising a blend of thermoplastic polyurethane and oligomeric polyalkylphosphonates are suitable for thermoplastic processing and molding of useful articles. A preferred embodiment containing an additive amount of a polyfunctional epoxy is characterized by an added margin of improved flame retardance.

DETAILED DESCRIPTION OF THE INVENTION

I. THERMOPLASTIC POLYURETHANES

In the context of the present invention, thermoplastic polyurethanes are those generally prepared from a diisocyanate, a polyester or polyether and a chain extender. These thermoplastic polyurethanes are substantially linear and maintain thermoplastic processing characteristics.

The thermoplastic polyurethanes may be synthesized by methods disclosed in U.S. Pat. No. 3,214,411, incorporated herein by reference. A particularly useful polyester resin which may be used as a starting material for the thermoplastic polyurethanes is produced from adipic acid nd a glycol having at least one primary hydroxyl group. The adipic acid is condensed with a suitable glycol or mixture of glycols.

The condensation is stopped when an acid number of from about 0.5 to about 2.0 is reached. The water formed during the reaction is removed simultaneously therewith or subsequently thereto so that the final water content is from about 0.01 to about 0.20%, preferably from about 0.01 to 0.05%.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol, up to about 1%, may be used along with the glycols such as, for example, trimethylol propane, glycerine, hexanetriol and the like. The resulting hydroxyl polyester may have a molecular weight of at least about 600, a hydroxyl number of about 25 to about 190 and preferably between about 40 and about 60, an acid number of between about 0.5 and about 2 and a water content of about 0.01 to about 0.2%.

The organic diisocyanate to be used in the preparation of the elastomer is preferably 4,4'-diphenylmethane diisocyanate. It is desired that the 4,4'-diphenylmethane diisocyanate contain less than about 5% of 2,4'-diphenylmethane diisocyanate and less than about 2% of the dimer of diphenylmethane diisocyanate. It is further desired that the acidity calculated as HCl be from about 0.0001 to 0.2%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Other diisocyanates may be used in preparing the thermoplastic polyurethanes such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like.

Any suitable chain extending agent having active hydrogen-containing groups reactive with isocyanate groups may be used such as, for example, diols including ethylene glycol, propylene glycol, butylene glycol, 1,4-butanediol, butenediol, butynediol, xylylene glycols, amylene glycols, 1,4-phenylene-bis-β-hydroxyethyl ether, 1,3-phenylene-bis-β-hydroxyethyl ether, bis-(hydroxymethyl)cyclohexane, hexanediol, thiodiglycol and the like; diamines including ethylene diamine, propylene diamine, butylene diamine, hexamethylene diamine, cyclohexylene diamine, phenylene diamine, tolylene diamine, xylylene diamine, 3,3'- dichlorobenzidine, 3,3'-dinitrobenzidine and the like, alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. Nos. 2,620,516, 2,621,166 and 2,729,618, all incorporated herein by reference, may be used. If desirable, a small amount of polyfunctional material may be utilized. This polyfunctional chain extender, however, should not be present in an amount greater than about 1% by weight. Any suitable polyfunctional compound may be used in this application such as, for example, glycerine, trimethylolpropane, hexanetriol, pentaerythritol and the like.

The polyester, the organic diisocyanate and the chain extender may be individually heated preferably to the temperature of from about 60° C. to about 135° and then the polyester and chain extender may be substantially simultaneously mixed with the diisocyanate. Preferably, the chain extender and the polyester, each of which has been previously heated, are first mixed and the resulting mixture is mixed with the heated diisocyanate. This method is preferred for the reason that the extender and the polyester will not react prior to the introduction of diisocyanate and rapid mixing with the diisocyanate is thus facilitated.

The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like of from about 0.001 to 0.050 parts by weight based on 100 parts of the polyester may be added to slow down the reaction. Of course, to increase the rate of reaction, any suitable catalyst may be added to the reaction mixture such as tertiary amines and the like as set forth in U.S. Pat. Nos. 2,620,516, 2,621,166 and 2,729,618, all incorporated herein by reference.

Other techniques for the production of thermoplastic polyurethanes useful in the context of the present invention are disclosed in the text *Polyurethanes: Chemistry and Technology*, Vol. II, pages 299–452, by J. H. Saunders and K. C. Frisch, Interscience Publishers, New York, 1964 and in the pamphlet *A Processing Handbook for Texin Urethane Elastoplastic Materials*, Mobay Chemical Corporation, Pittsburgh, Pa., both incorporated by reference herein.

Although adipate polyesters are preferred in producing suitable thermoplastic polyurethanes, polyesters which are based on succinic acid, suberic acid, sebacic acid, oxalic acid, methyl adipic acid, glutaric acid, pimelic acid, azelaic acid, phthalic acid, terephthalic acid, isophthalic acid and the like may be used.

Suitable polyesters for the production of thermoplastic polyurethanes also include those based on polymerization products of lactones, for example, caprolactones.

A polyester may be used instead of the polyester in the preparation of the thermoplastic polyurethane, preferably polytetramethylene glycol, having an average molecular weight between about 600 and 2000, and preferably about 1000. Other polyethers such as polypropylene glycol, polyethylene glycol and the like may be used providing their molecular weight is above about 600.

The above and other thermoplastic polyurethanes such as disclosed in U.S. Pat. Nos. 2,621,166, 2,729,618, 3,214,411, 2,778,810; Canadian Pat. Nos. 754,233, 733,577 and 842,325, all incorporated herein by reference, may be used in the context of the present invention.

"Thermoplastic polyurethane" as used herein may alternatively be defined as block polymers that are prepared from a diisocyanate, a polyester or polyether, and a chain extender and that are processable by all the standard techniques of compression or injection molding or by extrusion.

II. OLIGOMERIC POLYALKYLPHOSPHONATE RESINS

In the context of the present invention the oligomeric polyalkylphosphonate resins are characterized by their molecular structure which contains units conforming to

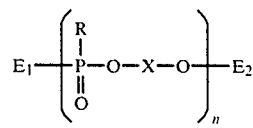

wherein R denotes any of $C_1$–$C_{12}$ alkyl, $C_2$–$C_{12}$ alkenyl, $C_6$–$C_{30}$ cycloalkyl or cycloalkenyl, $C_7$–$C_{30}$ arylalkyl or $C_8$–$C_{30}$ arylalkenyl, $E_1$ denotes

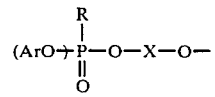

and $E_2$ denotes

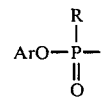

where Ar denotes phenyl or cresyl and n is between 5 and 22, preferably 10 to 20 and X is the residue of a suitable bisphenol as described below, preferably having 6 to 30 carbon atoms.

The oligomeric polyalkylphosphonate resins are further characterized in that their molecular weight ($\overline{M}w$) is about 2000 to about 10,000, preferably 3500 to about 8000, and they may be either branched or nonbranched.

The oligomeric polyalkylphosphonates of the invention are the product of a reaction described schematically as

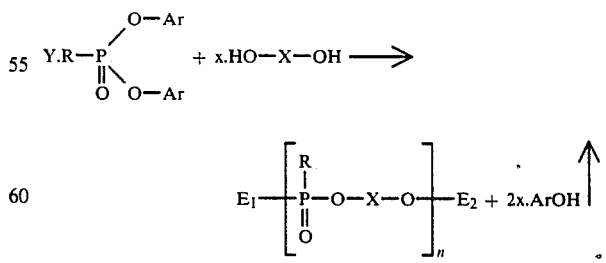

wherein
R denotes any of $C_1$–$C_{12}$ alkyl, $C_2$–$C_{12}$ alkenyl, $C_6$–$C_{30}$ cycloalkyl or cycloalkenyl, $C_7$–$C_{30}$ arylalkyl or $C_8$–$C_{30}$ arylalkenyl;
Ar denotes phenyl or cresyl, $E_1$ denotes

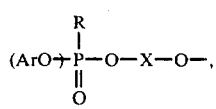

and $E_2$ denotes

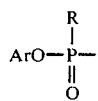

n is between 5 and 22, preferably 10 to 20 and the ratio of y to x is between about 1.04 and about 1.20, and X is the residue of suitable diphenols of the type HO—X—OH wherein X preferably has 6 to 30 carbon atoms.

Examples of suitable diphenols are those of the formulae (a) to (d) below:

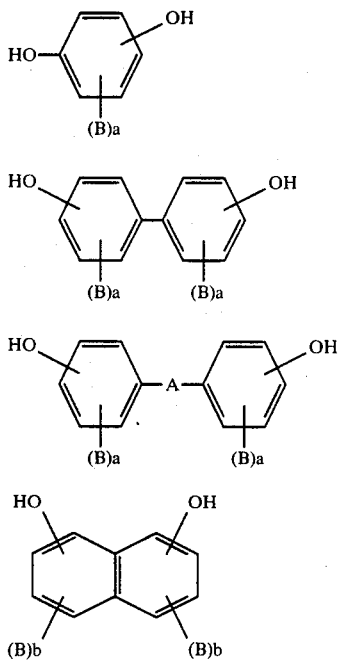

wherein

B is a $C_1$-$C_4$ alkyl group and/or F, Cl or Br, a is 0 or an integer from 1 to 4, b is 0 or an integer from 1 to 3 and A can denote $C_1$-$C_8$ alkylene, $C_2$-$C_8$ alkylidene, $C_5$-$C_6$ cycloalkylene, $C_5$-$C_6$ cycloalkylidene, —$SO_2$—, —CO—, —O— or —S—.

Aromatic dihydroxy compounds of the structures (a), (b) and (c), such as hydroquinone, 4,4'-dihydroxydiphenyl, 4,4'-dihydroxydiphenyl oxide, 4,4'-dihydroxydiphenyl sulfide, 4,4'-sulfonyldiphenol and bis-(4-hydroxyphenyl)-alkanes and -cycloalkanes, such as 2,2-bis-(4-hydroxyphenyl)-methane, 2,2-bis-(4-hydroxyphenyl)-propane (=bisphenol A), 2,2-bis-(3,5-dimethyl-4-hydroxyphenyl-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane, are preferred.

4,4'-dihydroxydiphenyl, 4,4'-sulfonyldiphenol, 1,1-bis-(4-hydroxyphenol)-cyclohexane, 4,4'-dihydroxydiphenyl sulfide and 2,2-bis-(4-hydroxyphenyl)-propane (bisphenol A) are particularly preferred.

In the process for the preparation of the oligomeric polyalkylphosphonates, a mixture comprising a suitable bisphenol (×moles) and a suitable phosphonic acid diaryl ester (1.04× to 1.20×moles) is heated up to about 280° C. under a nitrogen atmosphere while stirring to get a homogeneous solution.

A suitable transesterification catalyst in an amount of between $1 \times 10^{-7}$ to $2 \times 10^{-4}$ mole, preferably between $7 \times 10^{-6}$ to $2 \times 10^{-5}$ mole, in either case per 1 mole of bisphenol, is added, and the monohydroxyaryl (i.e., phenol or cresol) is distilled off while the temperature is increased to about 320° C. while simultaneously decreasing the pressure by applying vacuum. At the end of the polycondensation reaction, a vacuum of between about 15 to about 0.5 mbar is applied to distill off the residues of monohydroxyaryls and/or unreacted monomers. The reaction product may be then cooled and pelletized. The softening point of the resin, being about 80° C. to about 120° C., depends on its molecular weight as well as on the nature of both R and X.

The oligomer polyalkylphosphonates of the invention may be branched by the incorporation therewith of small amounts, preferably between about 0.05 and about 3.0 mol % (relative to the molar amount of the aromatic dihydroxy compounds used) of compounds which are trifunctional or more than trifunctional, for example, compounds with three or more than three phenolic hydroxyl groups. It is also possible to co-condense triaryl phosphates such as, for example, triphenyl phosphate, in amounts of between 0.05 and 3.0 mol % (relative to 100 mol % of phosphonic acid diaryl ester employed), as the trifunctional branching component, whereupon the resulting aromatic polyphosphonate is branched by phosphoric acid ester groups.

Examples of some of the compounds which have three or more than three phenolic hydroxyl groups and which can be used are phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane and 1,4-bis-(4,4''-dihydroxytriphenylmethyl)-benzene.

The catalysts suitable in the transesterification reaction to produce the oligomeric phosphonates of the invention are alkaline catalysts such as alcoholates of alkali metals and/or alkaline earth metals such as sodium methylate or calcium ethylate, sodium, potassium or lithium phenolates, sodium, potassium or lithium salts of the diphenols of the formulae (a) to (d) above, hydrides of alkali metals and/or alkaline earth metals such as lithium hydride, sodium borohydride or calcium hydride, oxides of alkali metals and/or alkaline earth metals such as lithium oxide, sodium oxide and/or barium oxide, amides of alkali metals and/or alkaline earth metals such as sodium amide or calcium amide, and basic alkali metal or alkaline earth metal salts of organic or inorganic acids such as sodium acetate, sodium benzoate or sodium carbonate. The preferred basic catalysts are alkali metal phenolates such as sodium phenolate.

Additionally suitable are neutral transesterification catalysts including:

(a) $C_1$–$C_{18}$ tetraalkyl titanates such as, for example, titanium tetraethylate, titanium tetrapropylate, titanium tetraisopropylate, titanium tetrabutylate, titanium tetraoctonate, and titanium tetrastearate.

(b) Dialkyl tin oxides such as, for example, diisopropyl tin oxide and dibutyl tin oxide.

(c) Dialkyl-dialkoxy tin compounds such as, for example, diisopropyl-dimethoxy-tin, dibutyl-diisopropoxy-tin and dibutyl-dimethoxy-tin.

(d) $C_3$ to $C_{18}$ tetraalkyl zirconates such as, for example, zirconium tetraacetyl acetonate, zirconium tetrabutylate, zirconium tetraoctonate and zirconium tetrastearate.

(e) $C_2$–$C_{18}$ trialkyl vanadylates such as, for example, vanadyl-ethylate $VO(OC_2H_5)_3$, vanadyl-isopropylate $VO(O—I—C_3H_7)_3$, and vanadyl-n-butylate $VO(O—n—C_4H_9)_3$.

(f) Antimony salts such as, e.g., antimony acetate, antimony phosphate, and antimony oxalate.

(g) Bismuth salts such as, e.g., bismuth stannate, bismuth acetate, bismuth benzoate, bismuth oxalate, bismuth titanate, and bismuth tribromophenolate.

(h) $C_2$–$C_4$ dialkyl stannic acid esters such as, e.g., dibutyl tin tartrate and dibutyl tin di-(o-phenyl)-phenolate.

(i) $C_2$–$C_4$ trialkyl stannic acid esters such as, e.g., tributyl tin acetate and tributyl tin benzoate.

(j) Mixtures of germanium dioxide or titanium dioxide with at least one of the catalysts mentioned in (a) to (i) above.

III. THE BLEND

In the practice of the invention, thermoplastic molding compositions characterized by their homogeneity and improved flame resistance are prepared by blending upon melting the thermoplastic polyurethane and the oligomeric polyalkylphosphonate of the invention. It is important to make certain that the oligomeric polyalkylphosphonate is dried prior to the melt blending, it is preferred to have a moisture content of less than 0.15%, preferably of less than 0.05% water.

The weight ratio between the thermoplastic polyurethane and the oligomeric polyalkylphosphonates may be between 90:10 and about 60:40, preferably 85:15 to about 70:30. The compositions may contain mold release agents, thermal and hydrolytic stabilizers, dyes, pigments, fillers and reinforcing agents as are well known in the art to be used in molding compositions.

Certain epoxy resins having 2 or a higher epoxy functionality were found to be useful as drip suppressants in the compositions of the present invention. Compositions of the invention comprising a blend of the thermoplastic polyurethane, oligomeric polyalkylphosphonate and epoxy resins of 2 or a higher epoxy functionality are the preferred embodiment of the present invention. In the preferred practice an amount of the epoxy resins sufficient to suppress the drip of the composition, preferably an amount of about 0.1 to about 5.0, more preferably 0.2 to about 3.0%, based on the weight of the blend, is added to effect an improved flammability rating.

Among the suitable epoxy resins are Epon 1031 from Shell Chemical, conforming structurally to

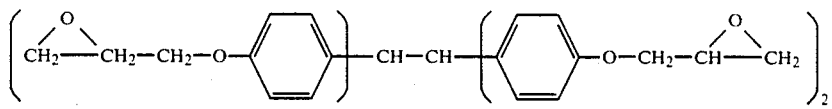

as well as bisphenol A bisglycidyl ether, conforming to

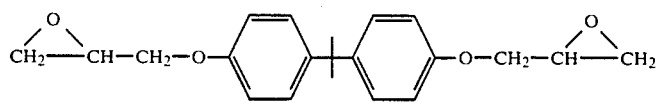

and triglycidyl-isocyanurate, available as Araldit PT 810 from Ciba-Geigy, Switzerland, conforming to

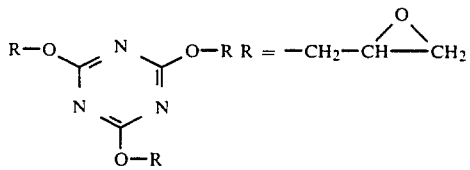

and phenol novolak-glycidyl-ether, available as Epoxy Resin 0163 from Ciba-Geigy, USA and conforming structurally to

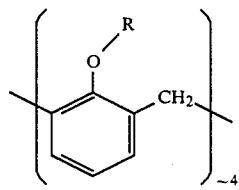

EXAMPLES

Example 1

The preparation of oligomeric polymethylphosphonates

A mixture of 684 gms of bisphenol A and 779 gms of diphenylmethylphosphonate was heated to 280° C. under a nitrogen atmosphere while stirring to get a homogeneous solution. 50 mg of $Zn(OAc)_2$ were then added and phenol was distilled off while raising the temperature to 320° C. and simultaneously decreasing the pressure while applying vacuum. At the end of the polycondensation reaction, further application of vacuum resulted in further distilling of phenol and unreacted monomers. The viscous light yellow reaction product (yield=800 gms) was removed from the reaction vessel, cooled and pelletized. The product was characterized in that its melting point was about 190°-220° C., its relative viscosity (as measured in a 0.5 wt. % solution in methylenedichloride at 25° C.) was 1.070, glass transition temperature=82° C., $\overline{M}n=1200$, $\overline{M}w=4900$.

Example 2

A composition in accordance with the present invention was prepared and its properties determined as summarized in the table below. In preparing composition A, a thermoplastic polyurethane based on polybutylene adipate, butane diol and MDI (relating by weight as 100/17/60) was used, available as Texin 445D from Mobay Chemical Corporation. Texin 445D is characterized in that its physical properties are as follows:

| Tensile strength, Mpa | 50 |
|---|---|
| Elongation at break, % | 550 |
| Elongation set, % | 35 |
| Modulus | |
| @ 100% elongation, Mpa | 8 |
| @ 300% elongation, Mpa | 17 |
| Hardness, Shore D | 45 |

The oligomeric polyalkylphosphonate used was the product of the preparation described in Example 1 above. The polyurethane was dried (100° C., 28-29 in. Hg 3 hours) prior to processing. The components were extruded on a 1½" single screw extruder at a temperature profile: rear 500° F., front 320° F. and die 450° F. The physical properties of the composition were determined on samples that have been conditioned for 16 hours at 110° C.

| Components | Composition A |
|---|---|
| Texin 445D, pbw | 80.0 |
| O—polymethylphosphonate, pbw | 20.0 |
| EPON 1031, pbw | 2.0 |
| Tensile strength, Mpa | 36 |
| Elongation, % | 500 |
| Set | 50 |
| 100 m | 7.9 |
| 200 m | 10.9 |
| 300 m | 17.5 |
| Hardness Shore D | 48 |
| Flammability rating UL-94, ⅛" | V-O |

Example 3

Compositions in accordance with the invention prepared in much the same way as was described above, except that the polyurethane was based on polyether were evaluated as summarized below. Texin 990A and 985A, both are products of Mobay Chemical Corporation and represent polyether based thermoplastic polyurethanes. The temperature profile upon the extrusion of the composition was: rear 350° F., front 360° F. and die 460° F. All compositions were homogeneous and rated V-2in accordance with UL-94 (⅛" specimens). The indicated additives, Cab-o-sil and E-9153 were found to be ineffective in terms of the flammability rating of the compositions of the invention.

| | 3-1 | 3-2 | 3-3 | 3-4 | 3-5 |
|---|---|---|---|---|---|
| Polyurethane, pbw | 90.0[1] | 90.0[1] | 90.0[1] | 90.0[2] | 90.0[2] |
| O—polymethylphosphonate, pbw | 10.0 | 10.0 | 10.0 | 10.0 | 10.0 |
| E-9153, pbw[3] | 2.0 | — | 2.0 | — | — |
| Cab-o-sil, pbw[4] | — | 2.0 | 2.0 | — | 2.0 |
| Properties | | | | | |
| Tensile strength | 19.2 | 28.0 | 26.2 | 35.3 | 36.5 |
| Elongation | 570 | 580 | 570 | 480 | 495 |
| Set | 60 | 45 | 45 | 35 | 40 |
| 100 m | 4.4 | 5.0 | 4.7 | 9.1 | 9.3 |
| 200 m | 5.6 | 6.8 | 6.3 | 12.4 | 12.6 |
| 300 m | 7.1 | 8.3 | 8.6 | 18.6 | 17.8 |
| Hardness, Shore D | 82 | 84 | 81 | 92 | 92 |

[1]and [2]respectively, are Texin 985A and Texin 990A - both denote polyether based thermoplastic polyurethane, products of Mobay Chemical Corporation.
[3]A propoxylated sucrose having an OH number of 370.
[4]Cab-o-sil is the trade name of a brand of fumed silica.

What is claimed is:

1. A homogeneous thermoplastic molding composition comprising (i) a thermoplastic polyurethane and (ii) an oligomeric polyalkylphosphonate characterized in that it contains structural units conforming to

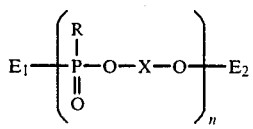

wherein R denotes any of $C_1$-$C_{12}$ alkyl, $C_2$-$C_{12}$ alkenyl, $C_6$-$C_{30}$ cycloalkyl or cycloalkenyl, $C_7$-$C_{30}$ arylalkyl or $C_8$-$C_{30}$ arylalkenyl, $E_1$ denotes

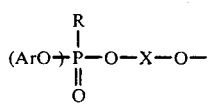

and $E_2$ denotes

where Ar denotes phenyl or cresyl and n is between 5 and 22 and X is the residue of a diphenol of the type

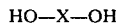

wherein X has 6 to 30 carbon atoms, said composition being further characterized in that said (i) is related by weight to said (ii) in a ratio of between 90:10 and 60:40.

2. The composition of claim 1 further comprising an epoxy resin characterized in having 2 or more epoxy functionalities.

3. The composition of claim 1 wherein said diphenol is of at least one member selected from the group consisting of

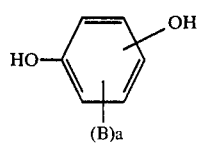

-continued (b) 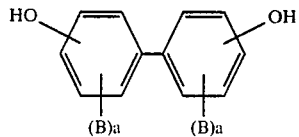

(c) 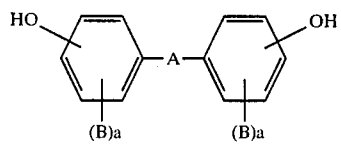

-continued (d) 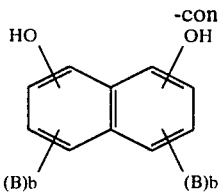

wherein
B denotes independently a $C_1$–$C_4$ alkyl group, F, Cl or Br atoms,
a is an integer of from 0 to 4
b is an integer of from 0 to 3 and
A denotes a $C_1$–$C_8$ alkylene, $C_2$–$C_8$ alkylidene, $C_5$–$C_6$ cycloalkylene, $C_5$–$C_6$ cycloalkylidene, —$SO_2$, —CO—, —O— or —S—.

4. The composition of claim 3 wherein said (i) is related by weight to said (ii) in a ratio of between 85:15 and about 70:30.

5. The composition of claim 1 wherein said n is between about 10 and 20.

6. The composition of claim 4 wherein said n is between about 10 and 20.

* * * * *